United States Patent
Groves, Jr. et al.

(10) Patent No.: US 8,328,143 B2
(45) Date of Patent: Dec. 11, 2012

(54) METHOD FOR ISOLATION OF VITAL FUNCTIONS IN A CENTRALIZED TRAIN CONTROL SYSTEM

(75) Inventors: Robert B. Groves, Jr., Manassas, VA (US); Richard A. Allshouse, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 573 days.

(21) Appl. No.: 12/355,697

(22) Filed: Jan. 16, 2009

(65) Prior Publication Data

US 2009/0184210 A1   Jul. 23, 2009

Related U.S. Application Data

(60) Provisional application No. 61/021,852, filed on Jan. 17, 2008.

(51) Int. Cl.
| | |
|---|---|
| B61L 27/00 | (2006.01) |
| B61L 21/00 | (2006.01) |
| B61L 23/34 | (2006.01) |
| B61L 3/22 | (2006.01) |
| B61C 17/12 | (2006.01) |
| G05D 1/00 | (2006.01) |
| G06F 7/00 | (2006.01) |
| G06F 19/00 | (2006.01) |
| G08G 1/01 | (2006.01) |

(52) U.S. Cl. ..... 246/3; 246/28 R; 246/34 R; 246/122 R; 246/167 R; 246/182 R; 701/19; 701/20; 701/117; 340/933; 340/936; 340/941

(58) Field of Classification Search ............ 701/19, 701/20, 117; 340/933–943; 246/3, 28 R, 246/34 R, 122 R, 167 R, 182 R
See application file for complete search history.

(56) References Cited

U.S. PATENT DOCUMENTS

| | | | |
|---|---|---|---|
| 4,090,173 A | | 5/1978 | Sibley |
| 4,368,534 A | | 1/1983 | Sibley |
| 4,711,418 A | * | 12/1987 | Aver et al. ............ 246/5 |
| 5,077,670 A | * | 12/1991 | Takai et al. ............ 701/33 |
| 5,533,695 A | * | 7/1996 | Heggestad et al. ............ 246/62 |
| 5,950,966 A | * | 9/1999 | Hungate et al. ............ 246/62 |
| 6,587,763 B2 | * | 7/2003 | Ishikawa ............ 701/19 |
| 2003/0176958 A1 | * | 9/2003 | Hagenbuch ............ 701/29 |
| 2005/0149795 A1 | * | 7/2005 | Manoni ............ 714/726 |
| 2007/0067674 A1 | * | 3/2007 | Essame et al. ............ 714/14 |

FOREIGN PATENT DOCUMENTS

| | | |
|---|---|---|
| EP | 0430192 A2 | 11/1990 |
| WO | 03093999 A2 | 11/2003 |

OTHER PUBLICATIONS

Ellett, Andrew, "AU Application No. 2009205875 Office Action Apr. 11, 2011",, Publisher: IPA, Published in: AU. Janhsen, Axel, "PCT Application No. PCT/US2009/031438 International Search Report Apr. 17, 2009",, Publisher: PCT, Published in: PCT.
Wickinger, Torsten, "Sicherer Datenaustausch zwischen den Integritatsbereichen von Betriebszentralen XP-001206493", "ETR Eisenbahntechnische Rundschau", Jun. 1, 2001, pp. 355-359, vol. 50, No. 6, Publisher: Hestra-Verlag, Hamburg, Published in: DE.

* cited by examiner

*Primary Examiner* — James Trammell
*Assistant Examiner* — Majdi Alsomiri
(74) *Attorney, Agent, or Firm* — Kaplan Breyer Schwarz & Ottesen, LLP

(57) ABSTRACT

A method and system for reducing, in a centralized train control system, the portion of a centralized server application that is considered vital while not reducing the overall vitality of the system.

12 Claims, 4 Drawing Sheets

METHOD FOR ISOLATION OF VITAL FUNCTIONS IN A CENTRALIZED TRAIN CONTROL SYSTEM

STATEMENT OF RELATED CASES

This case claims priority of U.S. Provisional Patent Application 61/021,852, which was filed Jan. 17, 2008 and is incorporated by reference herein.

FIELD OF THE INVENTION

The present invention relates to railway systems in general, and, more particularly, to centralized train control.

BACKGROUND OF THE INVENTION

A typical centralized train-control system 100 is depicted in FIG. 1. The system includes network control center 102, communications 108, train-borne equipment 112 (e.g., location determining device, etc.) on train 110, and trackside infrastructure 116, such as control points, defect detectors, rail-rail interfaces, and infrastructure associated with grade crossing 114 (e.g., predictor controllers, crossing warning devices, etc.).

In such a system, it is important to distinguish between "vital" and "non-vital" components and systems. The term "vital" means that a function must be done correctly or the failure to do so must result in a safe state. "Vital" is synonymous with "safety-critical."

In the context of FIG. 1 of system 100, a safety-critical centralized train-control system must have the means to ensure that no data that could compromise safety is sent to trackside or train-borne systems or equipment. Traditionally, this issue has been addressed by considering the entire centralized server application to be safety-critical. Indeed, as indicated in FIG. 1, only Dispatching Systems 106 in network control center 102 and Communications 108 are non-vital. Logic exists to take "non-vital" data from the entire enterprise (e.g., dispatch system, communications network, etc.) and use it in a "vital" manner.

Of particular note is the fact that the centralized train control server, as well as train-borne and trackside infrastructure, are vital.

Designing, developing, and testing safety-critical ("vital") applications is performed at a much lower productivity than non-vital applications. Furthermore, proving that an application is vital is much more time consuming and problematic as the size of the application increases. As such, the cost of developing and certifying the entire application as safety-critical or vital is prohibitive.

SUMMARY OF THE INVENTION

The present invention provides a way to reduce the portion of the centralized server application in a centralized train-control system that is considered to be "vital" while not reducing the overall vitality of the system.

Applying the methods of the invention to the typical system depicted in FIG. 1 enables the line between vital and non-vital functions and data to move into the centralized server application, allowing the bulk of the application to be considered non-vital. The vital portion of the system advantageously meets all FRA safety standards as well as the SIL3 (or potentially SIL4) requirements for European, Australian, and Asian Rail systems.

The migration of the line between vital and non-vital functions and data into the server application is made possible by an "Adjudicator." The Adjudicator, which comprises a plurality of algorithms implemented as software that is running on the centralized server (i.e., computer), is responsible for ensuring that non vital directives are given to trackside or train-borne systems in a safety-critical manner. The adjudicator is also responsible for ensuring that any failures in non-vital portions of the system are handled correctly. It is should be noted that the centralized server can be implemented as multiple computers.

In order to determine whether directives proposed by the non-vital portions of the system are correct, the Adjudicator maintains, separately from the non-vital components, a vital copy of all vital messages received by the server. The data in the vital copy will be used for validation purposes only (i.e., this vital copy will be used only to reject requests/enforce stricter safety measures but not to grant permission).

The adjudicator can be described in terms of a plurality of functional sub-components. The sub-components include:

an Authority Handler, which includes an Authority Monitor, Authority Releaser, and Authority Arbitrator;

a Trackside Handler, which includes a Trackside Monitor, a Trackside Validator, and a Trackside Arbitrator;

a Control Handler, which includes a Control Monitor; and a Location Handler, which includes a Location Monitor and Location Validator.

Non-vital components of the train control system will "propose" granting or removing authorities, setting switch positions, or updating the vital view of switches and train location by sending messages to the Adjudicator. These proposals must be validated by the Adjudicator (i.e., by its functional subcomponents) before any vital message is sent from the server. If any such proposals cannot be validated by the Adjudicator, a message will not be sent. Additionally, some Adjudicator subcomponents periodically check for activity from the non-vital components and react appropriately if none has been recorded.

All location reports are stored vitally in the Adjudicator (i.e., stored in computer-addressable memory locations accessible by the Adjudicator) after validating that the location is valid and could potentially be reached given the last known valid location and time passed, using a different algorithm than the non-vital Location Reporting component/functionality. All train locations used in Adjudicator logic come from this vital copy and not from any information passed by the non-vital components.

For trackside vitality, the Adjudicator receives periodic status messages from the non-vital Switch Awareness component/functionality as well as a status message every time a trackside status change occurs. The Adjudicator will compare this status message against its vital copy of trackside data. If the status message doesn't match the vital copy of the trackside data, the Adjudicator sets the state of all switches monitored by that trackside unit into the "unknown" state. The "unknown" state is a safe state for a switch; that is, the train cannot cross the switch without taking a safe action.

Additionally, if a proposal is received to change a switch position, the Adjudicator will attempt to validate the proposal with its vital copy of authority data. That is, the Adjudicator will check that no train has conflicting authority over the switch before allowing a command that is based on the proposal to be sent to the trackside unit.

For authority vitality, there are two areas of primary concern:

(1) no authority can be granted which is unsafe (based upon the authorities granted to other trains and upon the current switch settings); and (2) no authority can be rolled up/removed if a train may still be occupying its limits.

Concern no. 1 is handled by checking that no vital authorities have already been granted over any section of track overlapping the proposed authority (except as rules permit) and also by validating with the vital switch data that no switches are aligned improperly. Any conflict that is discovered causes, minimally, the authority to be rejected and potentially causes all conflicting authorities to be truncated at the point of requested overlap. The reason for rejection is returned to the non-vital components, for they may attempt to propose a new authority with smaller limits, facilitating stacking of authorities.

Concern no. 2—reducing authorities (e.g., rolling up, canceling)—might also create an unsafe condition. In particular, if a train is still occupying the limits of the authority, the track must still be protected or a new authority may be granted to a different train which puts it on the same track as the original train. This is especially true if automatic rollup of authorities is being performed on a leading train and given to the following train immediately in a moving block operation. The Adjudicator will ensure that no authority is reduced if the vital location data for the train shows that it may be occupying any portion of the track which is proposed to be released. If a conflict is detected, no reduction of authority will be allowed.

In order to ensure that failure of a non-vital component will not affect overall vitality of the server, the Adjudicator also performs passive monitoring of non-vital components. The non-vital Control Monitor Component will send periodic heartbeat messages to the Adjudicator. If these messages stop arriving, the Adjudicator will assume that a serious application failure, operating system failure, or hardware failure has occurred. The server will then fail safely by shutting down. As all vital communication must go through the Adjudicator, shutting down will ensure that no vital directives can be sent outside the server.

Additionally, the non-vital Authority component/functionality must send keep-alive messages to the Adjudicator if no authority proposals are being sent; the purpose for that is to prove that the Authority Management Component is still active. If no messages (including the keep-alive messages) are received in the given time period, the Adjudicator will truncate all authorities.

The Adjudicator also expects to receive messages from all trackside units and communicating trains in order to prove its stored data is not stale. If a location report for a given train has not been received in a specified amount of time, the Adjudicator will assume that the train is simultaneously at all points along its current authority so that worst case (safest) conditions are used in Adjudicator logic. In other words, the train must now be protected for its full limits of authority because it is unknown where the train is inside of its authority. It is notable that this is identical to the behavior for non-communicating trains. If a status message from a given trackside unit is not received in a timely manner, the Adjudicator will set the state of all switches to an "unknown" state and handle all authorities over those switches by truncation or generation of an automatic stop-and-inspect.

DETAILED DESCRIPTION

The following terms are defined below for use in this disclosure and the appended claims.

"Vital" means that a function must be done correctly, or the failure to do so must result in a safe state. Vital is synonymous with "safety-critical." A safety-critical system is defined when at least one identified hazard can lead directly to a mishap (accident). Standard 1483 (http://shop.ieee.org/ieeestore/) defines a safety-critical system as one where the correct performance of the system is critical to the safety, and the incorrect performance (or failure to perform the function) may result in an unacceptable hazard. According to most standards, hazards that have risk ratings of "Unacceptable" or "Undesirable" must be mitigated (i.e., reduce the risk, which is generally done by decreasing the frequency of occurrence) through system and equipment design. In order to do this, all of the functions that are necessary to implement the system must be identified. Functions that have to be implemented so that they are both (1) performed and (2) performed correctly are implemented fail-safely and are identified as "vital" functions. The fail-safely implementation means that all credible failures that could occur are examined and the occurrence of any one of them (or combination of failures in the event that the first failure is not self-evident) maintains the system in a safe state. That can be done either by forcing the system to a stop (or other safe state such as a less-permissive signal) or by transferring control to a secondary system, such as a redundant computer.

Figure 1:
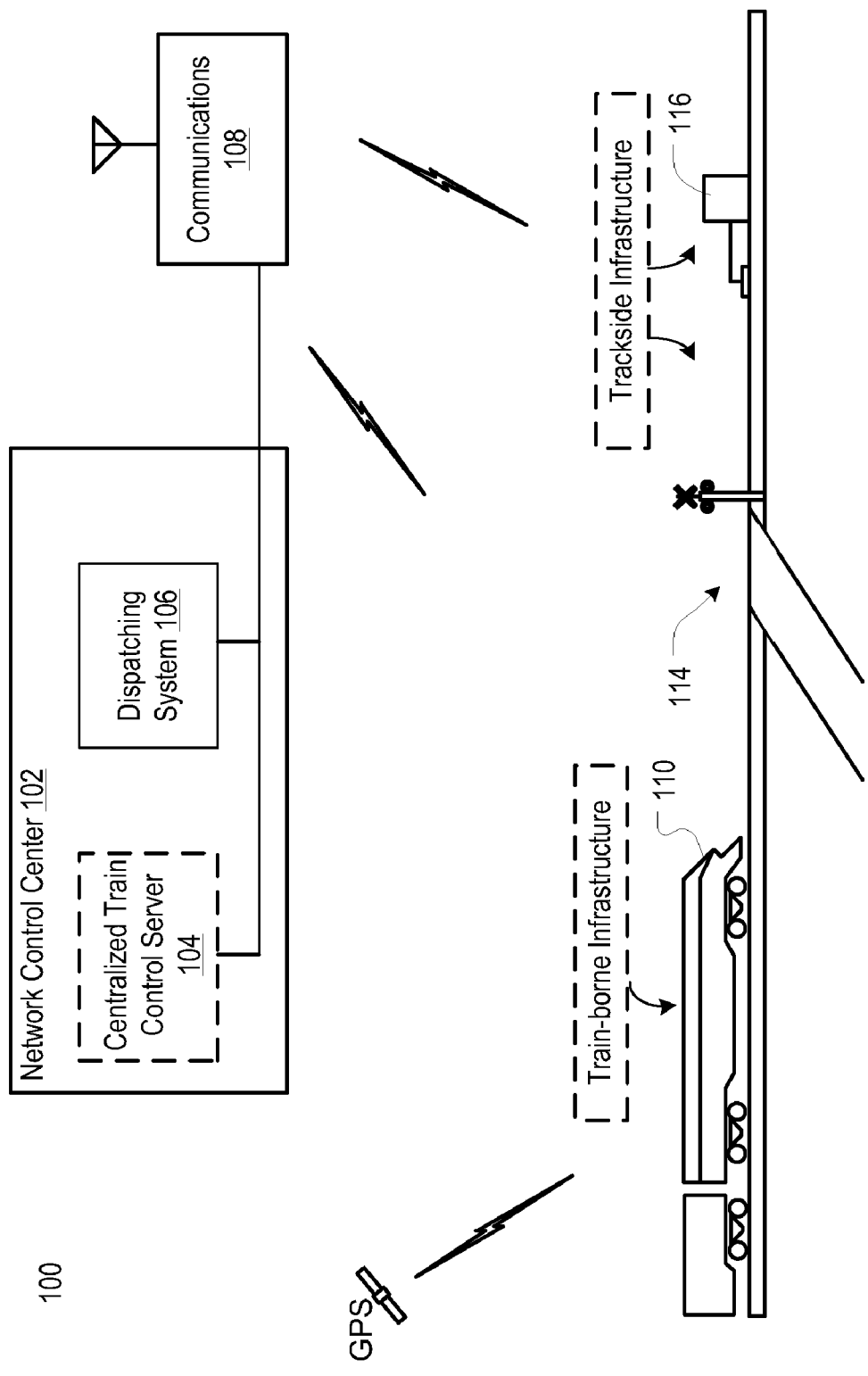
FIG. 1 depicts a centralized train-control system in the prior art.

As previously noted, applying the methods of the invention to the typical system depicted in FIG. 1 enables the line between vital and non-vital functions and data to move into the centralized server, allowing the bulk of the (software) application to be considered non-vital. The migration of the line between vital and non-vital component/functions and data into the server application can be appreciated by comparing FIG. 2 (the prior art) to FIG. 3, wherein non-vital components/functionality are depicted via a solid line and vital components/functionality are depicted via a dashed line. It will be appreciated by those skilled in the art that in this specification, the terms "component," "functionality," and "component/functionality" is meant to indicate an algorithm that is implemented as software and running on one or more processors, such as the centralized server.

Figure 2:
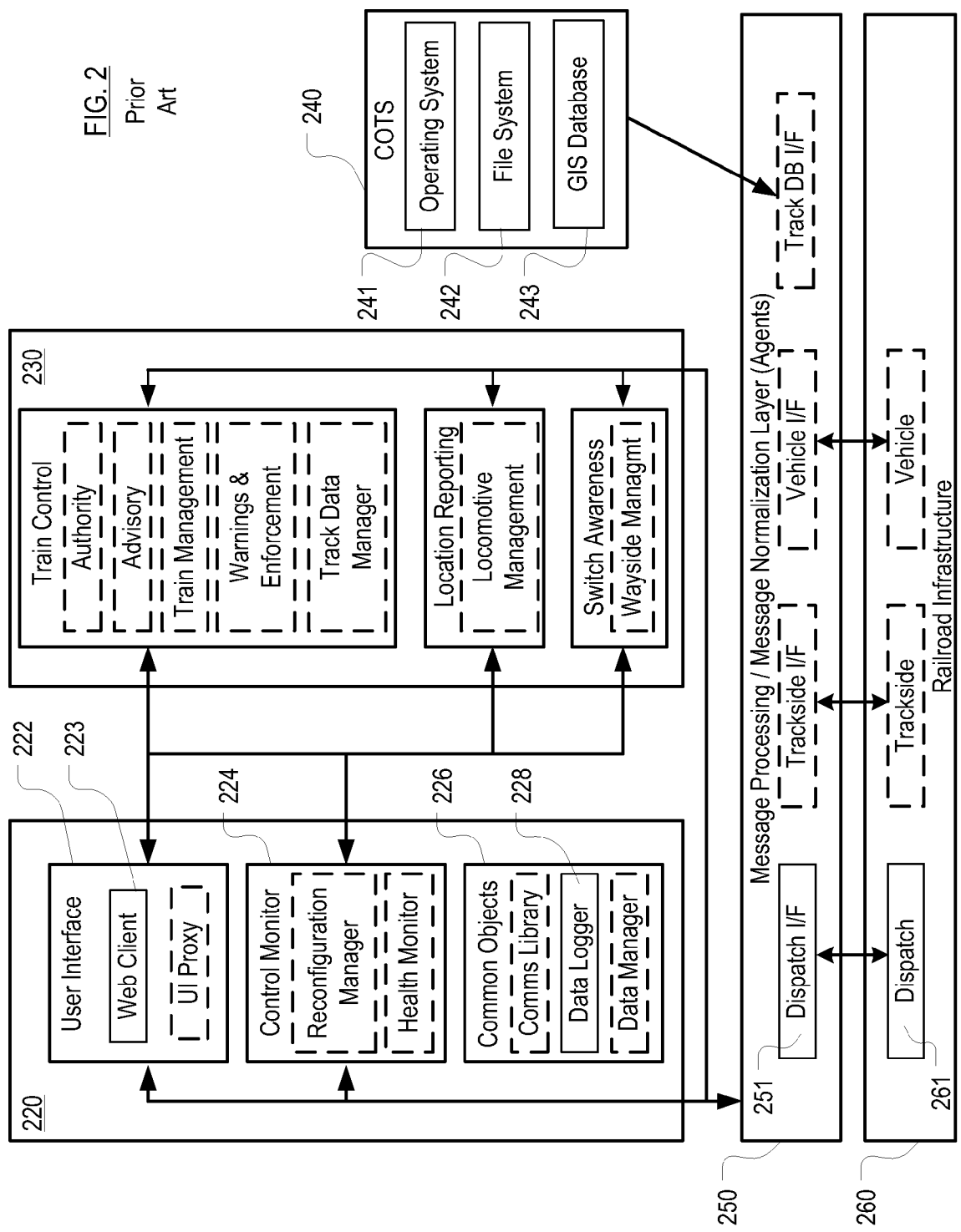
FIG. 2 depicts a block diagram of a prior-art centralized server application in a centralized train-control system, such as depicted in FIG. 1.

As can be seen in the prior-art system of FIG. 2, non-vital Supporting components/functionality 220 include Web Client 223 in User Interface 222 and Data Logger 228 in Common Objects 226. All "Commercial-Off-The-Shelf ("COTS") components 240, which include operating system 241, file system 242, and GIS database 243 are non-vital.

Dispatch interface 251 and Dispatch Infrastructure 261 are considered to be non-vital as well. All other components and functionality, notably all System components/functionality 230 of the server, are considered to be vital.

Figure 3:
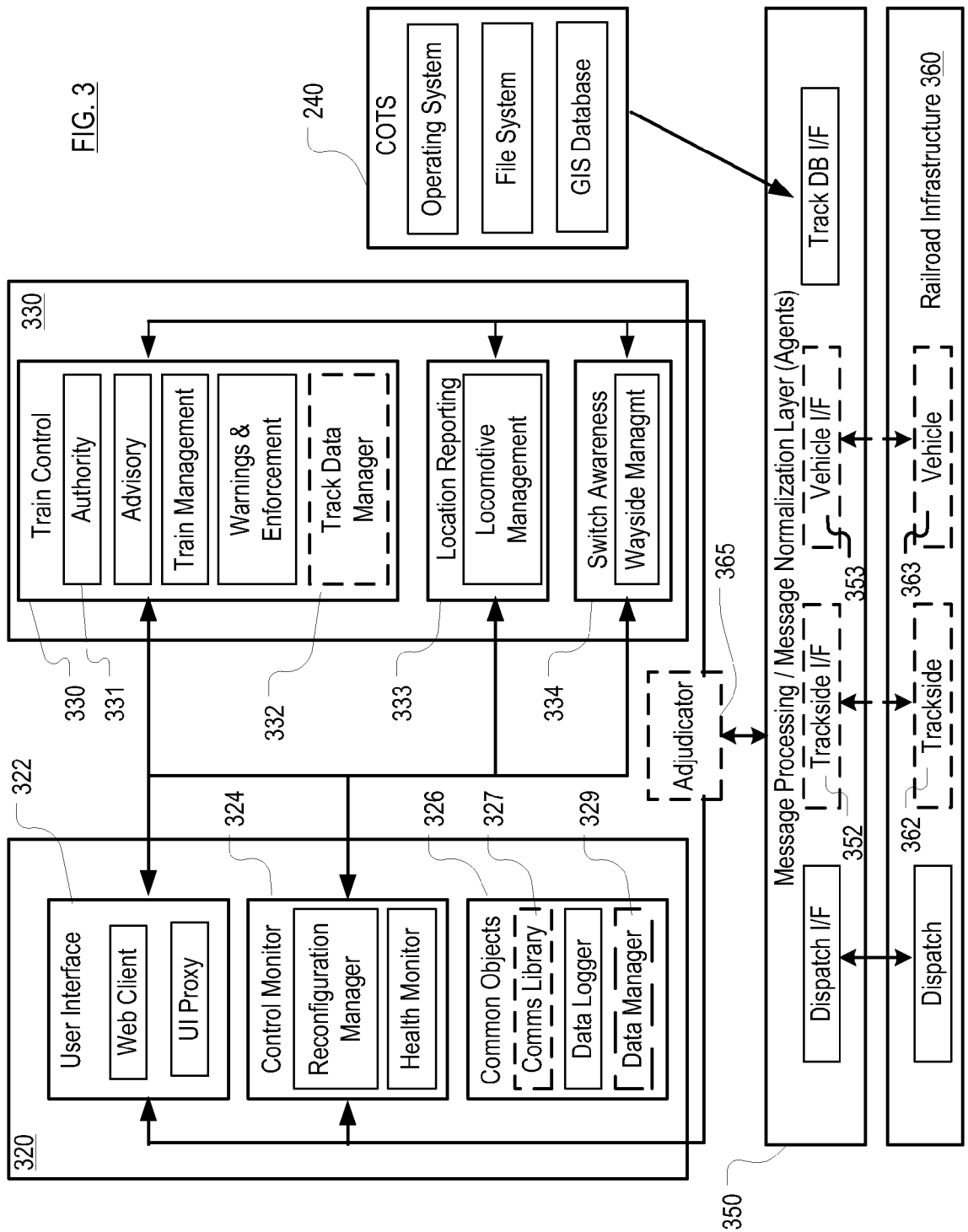
FIG. 3 depicts a block diagram of a centralized server application for a centralized train-control system in accordance with the illustrative embodiment of the present invention.

By contrast, and as depicted in FIG. 3, in accordance with the illustrative embodiment of the present invention, all aspects of System components/functionality 330, with the exception of Track Data Manager 332, become non-vital. Furthermore, all User-Interface Supporting components/functionality 322 and all Control-Monitor Supporting components/functionality 324 become non-vital. Also, Track Database interface 354 in Message Processing and Message Normalization layer 350 also becomes non-vital.

The status of a component as "vital" in the prior art centralized server, as compared to the illustrative embodiment of the present invention, is summarized below in Table I.

| FUNCTIONALITY | FUNCTIONALITY | PRIOR ART | ILLUSTRATIVE EMBODIMENT |
|---|---|---|---|
| User Interface | Web Client | | |
|  | UI proxy | ✓ | |
| Control Monitor | Reconfig Manager | ✓ | |
|  | Health Monitor | ✓ | |
| Common Objects | Comms Library | ✓ | ✓ |
|  | Data Logger | | |
|  | Data Manager | ✓ | ✓ |
| Train Control | Authority | ✓ | |
|  | Advisory | ✓ | |
|  | Train Management | ✓ | |
|  | Warnings & Enforcement | ✓ | |
|  | Track Data Manager | ✓ | ✓ |
| Location Reporting | Locomotive Mngmt. | ✓ | |
| Switch Awareness | Wayside Mngmt. | ✓ | |
| COTS | Operating System | | |
|  | File System | | |
|  | GIS Database | | |
| Msg. Proc/Norm. Layer | Dispatch I/F | | |
|  | Trackside I/F | ✓ | ✓ |
|  | Vehicle I/F | ✓ | ✓ |
|  | Track DB I/F | ✓ | |
| Railroad Infrastructure | Dispatch | | |
|  | Trackside | ✓ | ✓ |
|  | Vehicle | ✓ | ✓ |

Figure 4:
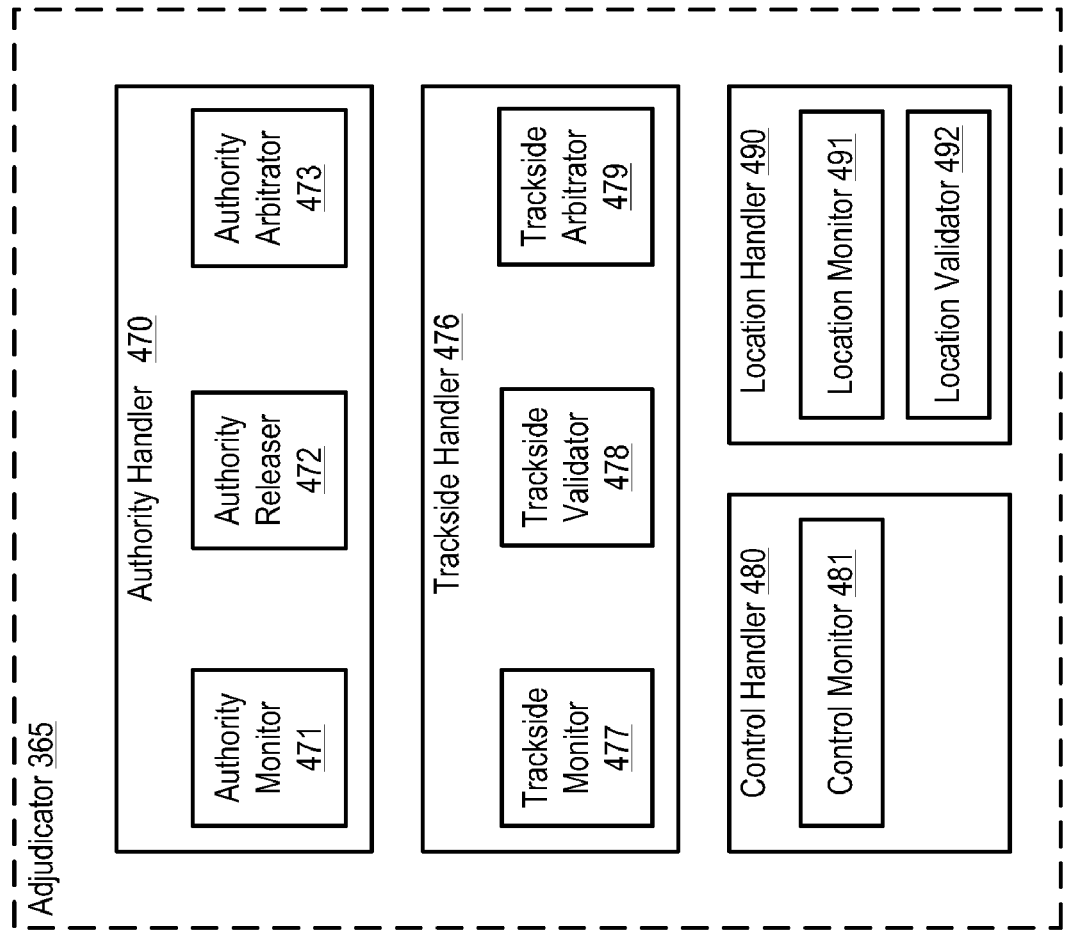
FIG. 4 depicts a block diagram of an Arbitrator component of the centralized server application of FIG. 3.

This "migration," which is quite significant, is made possible by Adjudicator 365 (FIG. 3), which is depicted via block diagram in FIG. 4. Adjudicator 365, which performs a variety of vitality checks, is responsible for ensuring that non vital directives are given to trackside or train-borne systems in a safety-critical manner. The Adjudicator is also responsible for ensuring that any failures in non-vital portions of the system are handled correctly.

For the illustrative embodiment, a train control system that grants (and removes) vital train movement authorities and gives vital directives to change switch (point) positions and no other vital information is assumed. In other embodiments consistent with the present invention, the train control system has differing vital messages using similar adjudication techniques.

In order to determine whether directives proposed by the non-vital portions of the system are correct, Adjudicator 365 maintains, separately from the non-vital components, a vital copy of all vital messages received by the server. As described further below, the data in the vital copy will be used for validation purposes only (i.e., this vital copy will be used only to reject requests/enforce stricter safety measures but not to grant permission).

FIG. 4 depicts a "functional" breakdown of Adjudicator 365 into a plurality of (software) sub-components. The sub-components include Authority Handler 470, Trackside Handler 476, Control Handler 480, and Location Handler 490.

The aforementioned functional sub-components can be broken down further, as follows. Authority Handler 470 includes: Authority Monitor 471, Authority Releaser 472, and Authority Arbitrator 473.

Authority Monitor 471 periodically checks for message traffic from non-vital Authority component/functionality 331 (FIG. 3). If no authority messages are being sent, and if no "keep-alive" messages are being sent in the absence of the authority proposals, Adjudicator 365 will truncate all authorities.

Authority Releaser 472 validates any request to rollup or revoke authority with vital location data. It will reject a request and protect the train using non-communicating train management rules if a conflict is detected.

Authority Arbitrator 473 validates all authorities that are proposed by non-vital Authority component/functionality 331 with vital data. Authority Arbitrator 473 will reject an authority request if there is invalid overlapping authority or if it detects a switch state.

Trackside Handler 476 includes the following functional sub-components: Trackside Monitor 477, Trackside Validator 478, and Trackside Arbitrator 479.

Trackside Monitor 477 periodically checks for trackside state from non-vital Switch Awareness component/functionality 334. If a trackside heartbeat is not received, Trackside Monitor 477 sets all switches to the "unknown" (i.e., safe) state.

Trackside Validator 478 stores a copy of the vital Trackside Unit Switch state message. If the state passed by the non-vital Trackside Management Component does not match the stored copy, the Trackside Validator sets all switches handled by the Trackside Management Component to an "unknown" state.

Trackside Arbitrator 479 validates any proposal to change a switch position by comparing the proposal to vital authority information. The Trackside arbitrator rejects any requests that are invalid.

Control Handler 480 includes Control Monitor 481. The Control Monitor periodically checks for a health message from non-vital Control Monitor Component 224. If a control heartbeat is not received, Control Monitor 481 truncates all authorities or will shutdown the Adjudicator.

Location Handler 490 includes Location Monitor 491 and Location Validator 492. Location Monitor 491 periodically checks for the last location report for a known train. If the location report has not been received, non-communicating train management rules are used.

Location Validator 492 stores a copy of the vital location message. If the location that is passed to the Location Validator by non-vital Location Reporting component/functionality 333 does not match the stored copy, non-communicating train management rules are used.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A centralized train control system comprising:
    a centralized server, wherein the server comprises an adjudicator that is implemented as software that is running on a processor in the server, and wherein the adjudicator is configured to:

(a) receive a request from a non-vital component of the centralized train control system, wherein the request proposes a directive to be transmitted to at least one of a trackside and a train-borne component of the centralized train control system, (b) evaluate the request, based on vital resources, to determine whether to validate or reject the proposed directive, wherein the vital resources comprise a vital copy of vital messages that are received by the server, and (c) when the proposed directive is validated, transmit a vital message that comprises the directive.

2. The system of claim 1 wherein the adjudicator is further configured to:

(d) when the proposed directive is rejected, transmit a reason for rejection.

3. The system of claim 1 wherein the adjudicator includes an authority handler that is configured to periodically check for message traffic from a non-vital authority management component.

4. The system of claim 1 wherein the adjudicator includes an authority arbitrator that is configured to use vital data to validate any authority proposed by a non-vital authority management component.

5. The system of claim 1 wherein the adjudicator includes an authority releaser that is configured to use vital data to validate any request to rollup or to revoke authority.

6. The system of claim 1 when the adjudicator includes a trackside arbitrator that is configured to use vital authority information to attempt to validate any request to change a switch position.

7. A method for operating, via an adjudicator, a centralized train control system, the method comprising:

(a) receiving, by the adjudicator, a request from a non-vital component of the centralized train control system, wherein the request proposes a directive to be transmitted to at least one of a trackside and a train-borne component of the centralized train control system;

(b) evaluating the request by the adjudicator, based on vital resources, to determine whether to validate or reject the proposed directive, wherein the vital resources comprise a vital copy of vital messages that are received by a centralized server that executes the adjudicator; and (c) when the adjudicator validates the proposed directive, transmitting a vital message comprising the directive;

wherein the centralized train control system comprises the centralized server.

8. The method of claim 7 further comprising:

when the adjudicator rejects the proposed directive, transmitting a reason for rejection.

9. The method of claim 7 wherein the adjudicator includes an authority handler, wherein the authority handler periodically checks for message traffic from a non-vital authority management component.

10. The method of claim 7 wherein the adjudicator includes an authority arbitrator that uses vital data to validate any authority proposed by a non-vital authority management component.

11. The method of claim 7 wherein the adjudicator includes an authority releaser that uses vital data to validate any request to rollup or to revoke authority.

12. The method of claim 7 wherein the adjudicator includes a trackside arbitrator that uses vital authority information to attempt to validate any request to change a switch position.

\* \* \* \* \*